US010952101B2

(12) United States Patent
Hong et al.

(10) Patent No.: US 10,952,101 B2
(45) Date of Patent: Mar. 16, 2021

(54) UPLINK DATA TRANSMISSION METHOD AND DEVICE, AND TERMINAL FOR ESTABLISHING A COMMUNICATION CONNECTION WITH A CORRESPONDENT NODE

(71) Applicant: Beijing Xiaomi Mobile Software Co., Ltd., Beijing (CN)

(72) Inventors: Wei Hong, Beijing (CN); Juejia Zhou, Beijing (CN); Ming Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 19 days.

(21) Appl. No.: 16/235,856

(22) Filed: Dec. 28, 2018

(65) Prior Publication Data
US 2019/0141579 A1 May 9, 2019

Related U.S. Application Data

(63) Continuation of application No. PCT/CN2016/087614, filed on Jun. 29, 2016.

(51) Int. Cl.
*H04W 28/20* (2009.01)
*H04W 28/08* (2009.01)
(Continued)

(52) U.S. Cl.
CPC .......... *H04W 28/20* (2013.01); *H04B 17/318* (2015.01); *H04W 28/0236* (2013.01);
(Continued)

(58) Field of Classification Search
CPC . H04W 28/20; H04W 28/08; H04W 28/0236; H04W 88/06; H04W 72/1215;
(Continued)

(56) References Cited

U.S. PATENT DOCUMENTS

2014/0293970 A1* 10/2014 Damnjanovic ....... H04L 5/0078
370/336
2015/0312831 A1* 10/2015 Sang ................ H04W 36/0083
370/236
(Continued)

FOREIGN PATENT DOCUMENTS

CN 102695291 A 9/2012
CN 103220786 A 7/2013
(Continued)

OTHER PUBLICATIONS

Japanese Notice of Reasons for Refusal dated Nov. 21, 2019 in Japanese Application No. 2018-568797 (with English translation), citing documents AX and AY therein, 10 pages.
(Continued)

*Primary Examiner* — Tejis Daya
(74) *Attorney, Agent, or Firm* — Oblon, McClelland, Maier & Neustadt, L.L.P.

(57) ABSTRACT

The disclosure relates to a data transmission method and device, and a terminal. The method is applied to a terminal that establishes a communication connection with a correspondent node through a first link provided by a cellular network and a second link provided by a Wireless Local Area Network (WLAN), respectively. The method includes acquiring relevant information of the WLAN that is accessed by a home terminal, the relevant information of the WLAN being used to indicate a data distribution capability of the WLAN; determining an amount of data transmitted to the correspondent node by the second link based on the relevant information of the WLAN; and transmitting uplink data to the correspondent node through the second link based on the amount of the data transmitted to the correspondent node.

10 Claims, 6 Drawing Sheets

(51) Int. Cl.
*H04W 28/02* (2009.01)
*H04B 17/318* (2015.01)
*H04W 88/06* (2009.01)
*H04W 72/12* (2009.01)
*H04W 84/12* (2009.01)

(52) U.S. Cl.
CPC ........ *H04W 28/08* (2013.01); *H04W 28/0278* (2013.01); *H04W 72/1215* (2013.01); *H04W 84/12* (2013.01); *H04W 88/06* (2013.01)

(58) Field of Classification Search
CPC . H04W 28/0278; H04W 84/12; H04W 76/16; H04W 72/0486; H04W 72/1226; H04B 17/318
See application file for complete search history.

(56) References Cited

U.S. PATENT DOCUMENTS

| | | | |
|---|---|---|---|
| 2016/0007268 A1* | 1/2016 | Jung | H04W 48/08 370/338 |
| 2016/0234726 A1* | 8/2016 | Nuggehalli | H04W 36/0022 |
| 2016/0242235 A1 | 8/2016 | Vasudevan et al. | |
| 2016/0338068 A1* | 11/2016 | Cheng | H04W 88/06 |
| 2017/0055283 A1* | 2/2017 | Shrivastava | H04W 76/15 |
| 2017/0171777 A1* | 6/2017 | Laselva | H04W 24/10 |
| 2017/0288949 A1* | 10/2017 | Jactat | H04W 36/22 |
| 2017/0331569 A1* | 11/2017 | Van Der Velde | H04B 17/382 |

FOREIGN PATENT DOCUMENTS

| | | |
|---|---|---|
| CN | 105592528 A | 5/2016 |
| CN | 105659652 A | 6/2016 |
| KR | 10-2010-0072227 | 6/2016 |
| RU | 2 481 749 C2 | 5/2013 |
| WO | 2013/041947 A1 | 3/2013 |
| WO | WO 2015/059055 A2 | 4/2015 |

OTHER PUBLICATIONS

Russian Federation Search Report dated Sep. 5, 2019 in Russian Patent Application No. 2019102327/07(004078) (with English translation), citing documents AL and AM therein, 4 pages.

Russian Federation Office Action dated Sep. 5, 2019 in Russian Patent Application No. 2019102327/07(004078) (with English translation), citing documents AL and AM therein, 4 pages.

Chinese Notice of Reexamination dated Nov. 28, 2019 in Chinese Patent Application No. 201680000711.6.

"Discussion on Scheduling Issue for UL Split Bearer in eLWA" CATT, 3GPP TSG RAN WG2 #94, 2-163376, May 13, 2016, pp. 1-3.

"BSR Issue in UL LWA Bearer" LG Electronics Inc., 3GPP TSG RAN WG2 #94, R2-164156, May 14, 2016, pp. 1-3.

English translation of the International Preliminary Report on Patentability and Written Opinion of the International Searching Authority dated Jan. 10, 2019 in PCT/CN2016/087614 filed Jun. 29, 2016, 8 pages.

Chinese Office Action dated Feb. 3, 2019 in Patent Application No. 201680000711.6.

Chinese Office Action dated Apr. 10, 2019 in Patent Application No. 201680000711.6.

Extended European Search Report dated Apr. 16, 2019 in Patent Application No. 16906629.7, citing document AY therein, 8 pages.

"UL Support for LWA" Intel Corporation, 3GPP TSG-RAN2 Meeting #94; R2-163572, vol. RAN WG2, XP051105026, May 22, 2016, 4 pages.

International Search Report issued in PCT Application No. PCT/CN2016/087614 dated Mar. 1, 2017, citing documents AB, AO, AQ, and AR therein (w/ English Translation).

Office Action issued in Chinese Patent Application No. 201680000711.6 dated Nov. 26, 2018, citing documents AB and AO-AS therein (w/ Concise Explanation of Relevance).

Notice of rejection of Japanese application No. 2018-568797 dated Jun. 30, 2020 (4 pages).

First office action of Indian application No. 201937000732 wth English Translation dated Aug. 31, 2020, citing documents AA and AO therein (6 pages).

Decision of Rejection of Korean application No. 10-2019-7002875 dated Jul. 16, 2020 (3 pages).

Decsion of Refection of Korean application No. 10-2019-7002875 dated Sep. 14, 2020 (4 pages).

Preliminary office action of Brazilian application No. 1120180773275-1 dated Jul. 30, 2020, citing documents AP-AR therein (5 pages).

* cited by examiner

UPLINK DATA TRANSMISSION METHOD AND DEVICE, AND TERMINAL FOR ESTABLISHING A COMMUNICATION CONNECTION WITH A CORRESPONDENT NODE

CROSS-REFERENCE TO RELATED APPLICATIONS

This application is a continuation application of, is based upon, and claims priority to International Patent Application PCT/CN2016/087614, filed on Jun. 29, 2016, the entire contents of which are incorporated herein by reference.

TECHNICAL FIELD

The present disclosure relates to the technical field of wireless communication, and in particular to a data transmission method and device, and a terminal.

BACKGROUND

As the load of operators' cellular networks becomes increasingly heavier, Wireless Local Area Networks (WLANs) receive more and more attention of operators. The operator deploys an operator-level WLAN as a hot supplement of the cellular network to help the cellular network perform flow division, such that the pressure of rapid flow growth of the cellular network is relieved, thus improving the user experience.

The LTE-WLAN Aggregations (LWA) technology can ensure deep integration between a Long Term Evolution (LTE) network and the WLAN on a wireless side to balance their dynamic loads. The LWA technology mainly refers to the dual-link technology. That is, all data from a core network may be first transmitted to an evolved NodeB (eNB) in the LTE network. The eNB may determine which data are transmitted to User Equipment (UE) through the LTE network and which data are transmitted to the UE through the WLAN in accordance with a series of measurement results, pre-configurations, etc.

At present, no relevant solution has been proposed for an uplink transmission process.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method of data transmission, applied to a terminal that establishes a communication connection with a correspondent node through a first link provided by a cellular network and a second link provided by a Wireless Local Area Network (WLAN), respectively. The method includes acquiring relevant information of the WLAN that is accessed by a home terminal, the relevant information of the WLAN being used to indicate a data distribution capability of the WLAN; determining an amount of data transmitted to the correspondent node by the second link based on the relevant information of the WLAN; and transmitting uplink data to the correspondent node through the second link based on the amount of the data transmitted to the correspondent node.

In an example, the relevant information of the WLAN includes at least one of a version number of the WLAN, a Received Signal Strength Indication (RSSI) of the WLAN, an available channel utilization of the WLAN, a Basic Service Set (BS S) load of the WLAN, and/or a number of stations (STA) accessed in the WLAN.

According to an aspect, when determining the amount of the data transmitted to the correspondent node, the method includes acquiring a current amount of data in an uplink buffer that is configured to store the uplink data; and determining the amount of the data transmitted to the correspondent node by the second link based on the relevant information of the WLAN and the current amount of data.

According to another aspect, the method further includes sending a Buffer Status Report (BSR) to a base station in the cellular network, wherein the BSR includes a difference value between the current amount of data and the amount of the data transmitted by the second link, and wherein the base station is configured to allocate an uplink resource for the terminal based on the difference value; and acquiring the uplink resource allocated by the base station.

According to yet another aspect, the method further includes acquiring a network status; and adjusting an amount of data transmitted by one of the first link and the second link based on the network status.

In an example, the network status includes at least one of a link quality of the first link, a link quality of the second link, a load condition of the cellular network, and/or a load condition of the WLAN.

Aspects of the disclosure also provide a terminal that establishes a communication connection with a correspondent node through a first link provided by a cellular network and a second link provided by a Wireless Local Area Network (WLAN), respectively. The terminal includes a processor and a memory for storing instructions executable by the processor. The processor is configured to acquire relevant information of the WLAN that is accessed by a home terminal, the relevant information of the WLAN is used to indicate a data distribution capability of the WLAN; determine an amount of data transmitted to the correspondent node by the second link based on the relevant information of the WLAN; and transmit uplink data to the correspondent node through the second link based on the amount of the data transmitted to the correspondent node.

Aspects of the disclosure also provide a non-transitory computer-readable medium storing instructions that, when executed by one or more processors of a device that establishes a communication connection with a correspondent node through a first link provided by a cellular network and a second link provided by a Wireless Local Area Network (WLAN), respectively, cause the device to acquire relevant information of the WLAN which is accessed by a home terminal, the relevant information of the WLAN being used to indicate a data distribution capability of the WLAN; determine an amount of data transmitted to the correspondent node by the second link based on the relevant information of the WLAN; and transmit uplink data to the correspondent node through the second link based on the amount of the data transmitted to the correspondent node.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the disclosure. Instead, they are merely examples of apparatuses and methods consistent with aspects related to the disclosure as recited in the appended claims.

Figure 1:
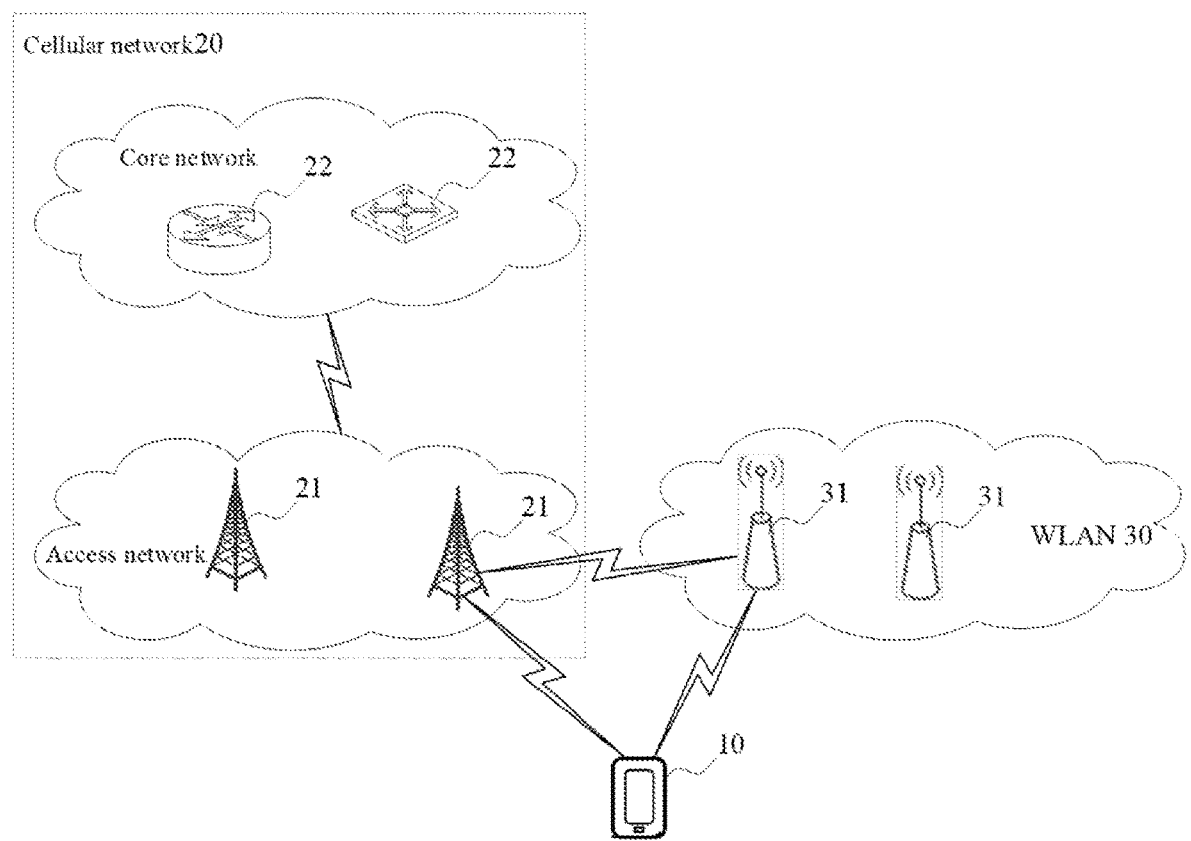
FIG. 1 is a schematic view of a network architecture according to an exemplary aspect of the present disclosure.

FIG. 1 is a schematic view of a network architecture according to an exemplary aspect. The network architecture includes a terminal 10, a cellular network 20 and a WLAN 30.

The cellular network 20 is also referred to as a mobile network, and usually includes a core network and an access network. Several core network devices 22, such as a Mobility Management Entity (MME) and a Service Gateway (S-GW), are deployed in the core network. Several base stations 21 are deployed in the access network. The base station 21 and the terminal 10 communicate with each other through a certain air interface technology, for example, a cellular technology. In an LTE system, the base station 21 and the terminal 10 communicate with each other through a Uu interface. The technical solution described in the aspects of the present disclosure may be applicable to the LTE system or other wireless communication systems adopting various wireless access technologies, for example, systems adopting CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), etc. Besides, the technical solution may also be applicable to a follow-up evolution system of the LTE system, for example, a 5G (5th Generation) system. To make it clear, only the LTE system is taken as an example for explanation. In the LTE system, an E-UTRAN (Evolved Universal Terrestrial Radio Access Network) serves as the wireless access network, and an EPC (Evolved Packet Core) serves as the core network.

The WLAN 30 includes a plurality of Access Points (AP) 31. The AP 31 is also referred to as wireless access points or hot spots and used for the terminal 10 to access the WLAN 30. The AP 31 and the terminal 10 communicate with each other through a wireless network, for example, a Wi-Fi (Wireless Fidelity) network.

In a scenario that the cellular network 20 and the WLAN 30 are aggregated, the terminal 10 establishes a communication connection with a correspondent node through a first link provided by the cellular network 20 and a second link provided by the WLAN 30. As shown in FIG. 1, the first link is a communication link for direct connection between the terminal 10 and the base station 21. The second link is a communication link established between the terminal 10 and the base station 21 through the AP 31.

Taking the cellular network 20 as an LTE network for example, in a scenario of an LWA, the LTE network may be aggregated with the WLAN 30 by means of colocation fusion. The AP 31 in the WLAN 30 may be integrated with an eNB in the LTE network. Alternatively, the LTE network may be aggregated with the WLAN 30 by means of non-colocation fusion. The AP 31 in the WLAN 30 may be connected to the eNB in the LTE network through an Xw interface.

For a downlink transmission process, after receiving a data packet transmitted from the core network, the base station 21 in the cellular network 20 may draw many factors into consideration, such as a current load condition of the base station 21, a load condition of the AP 31 in the connected WLAN 30, and a link condition between the terminal 10 and the AP 31 in the WLAN 30, etc. to dynamically determine whether certain data packets or certain services are transmitted to the terminal 10 by the cellular network or by the WLAN 30. If the base station 21 decides to transmit certain data packets from the WLAN to the terminal 10, these data packets can be dynamically distributed through a PDCP (Packet Data Convergence Protocol) layer. The data packets of the cellular network 20 are adapted and packaged by a newly added adaptation layer or adaptation function and then sent to the AP 31 in the connected WLAN 30, and then is sent by the AP 31 in the WLAN 30 to the corresponding terminal 10. After receiving the data packets distributed by the WLAN 30, the terminal 10 may merge them with the data packet received by the cellular network 20 at the PDCP layer. Then, the merged data packets are transmitted to an upper level. Referring to introductions and explanations in the method aspect of the present disclosure for the detail of an uplink transmission process.

In the aspect of the present disclosure, the terms "network" and "system" are often alternatively used, but their connotations may be understood by those skilled in the art. The terminal involved in the aspects of the present disclosure may include various hand-held devices, vehicle-mounted devices, wearable devices and computer devices, having a wireless communication function, or other processing devices connected to a wireless modem, as well as UE (User Equipment), an MS (Mobile Station), a terminal device, etc. in various formats. For the convenience of description, all the above-mentioned devices are collectively referred to as terminals. The BS (Base Station) involved in the aspect of the present disclosure is a device, which is deployed in the wireless access network and configured to provide a wireless communication function for the terminal. The base station may include a macro base station, a micro base station, a relay station, an access point, etc. In systems adopting different wireless access technologies, devices with the functions of the base stations may have different names. For example, the device with the function of the base station is referred to as an evolved Node B (eNB or eNodeB) in the LTE system, and referred to as a node B in a 3G communication system. For the convenience of description, the devices for providing the wireless communication function for the terminal are collectively referred to as base stations or BS.

Figure 2:
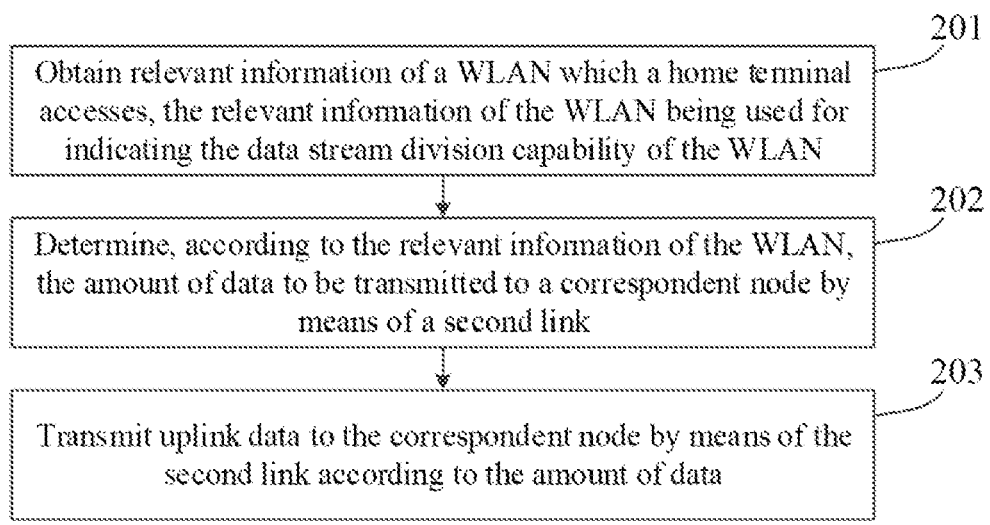
FIG. 2 is a flowchart of a data transmission method according to an exemplary aspect of the present disclosure.

FIG. 2 is a flowchart of a data transmission method according to an exemplary aspect. The method may be applied to a terminal in the implementing environment of FIG. 1. The terminal establishes a communication connection with a correspondent node through a first link provided by a cellular network and a second link provided by the WLAN. The method may include the following steps.

In step 201, relevant information of the WLAN accessed by a home terminal is acquired, and the relevant information of the WLAN is used to indicate a data distribution capability of the WLAN.

In step 202, the amount of data transmitted to the correspondent node by the second link is determined in accordance with the relevant information of the WLAN.

In step 203, uplink data is transmitted to the correspondent node through the second link in accordance with the amount of data.

To sum up, the data transmission method provided by the aspect acquires the relevant information of the WLAN which is accessed by the home terminal, determines the amount of data transmitted to the correspondent node by the second link provided by the WLAN in accordance with the relevant information of the WLAN, and transmits the uplink data to the correspondent node through the second link in accordance with the determined amount of data. An uplink transmission solution in the LWA technology is provided. The sizes of data transmitted on the first link provided by the cellular network and the second link provided by the WLAN are determined based on the relevant information of the WLAN. Thus, distributing transmission of the uplink data is realized. The data transmission pressure of the cellular network is reduced. The allocation reasonability of the amount of the data transmitted on the two links are guaranteed.

Figure 3:
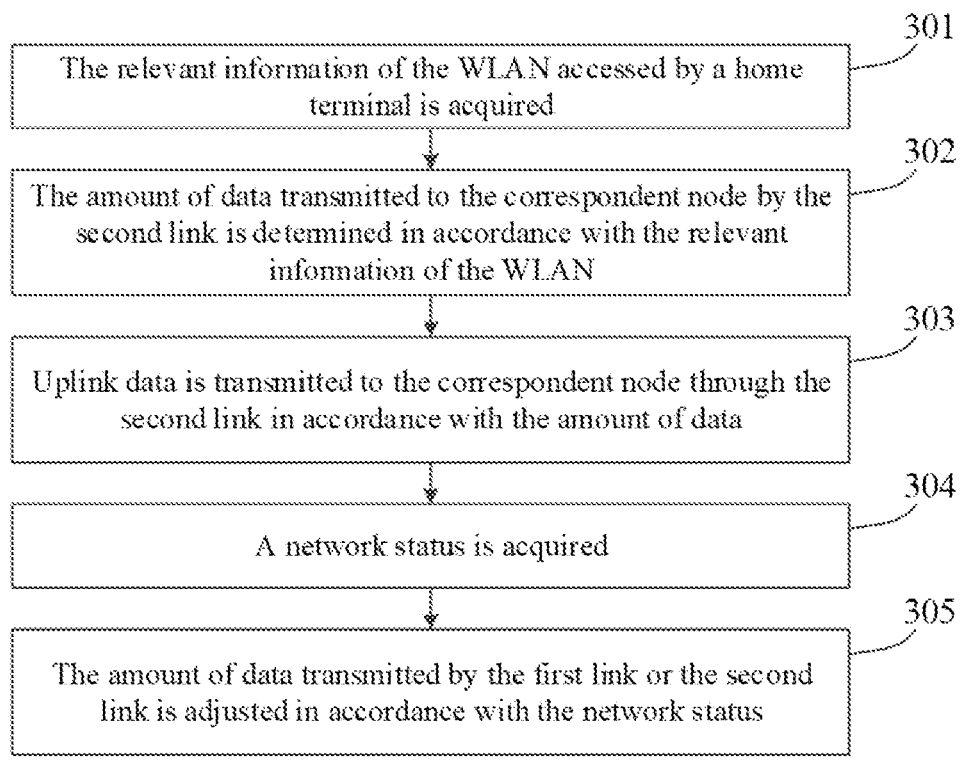
FIG. 3 is a flowchart of a data transmission method according to another exemplary aspect of the present disclosure.

FIG. 3 is a flow chart of a data transmission method according to another exemplary aspect. The method may be applied to a terminal in an implementation environment illustrated in FIG. 1. The terminal establishes a communication connection with a correspondent node through a first link provided by a cellular network and a second link provided by a WLAN respectively. The method may include the following steps.

In step 301, the relevant information of the WLAN accessed by a home terminal is acquired.

The terminal acquires the relevant information of the WLAN accessed by the home terminal. The relevant information of the WLAN is used to indicate a data distribution capability of the WLAN. Herein, the data distribution capability of the WLAN may be measured from the perspective of the version, load condition, link quality and the like of the WLAN.

Optionally, the relevant information of the WLAN includes but not limited to at least one of a version number of the WLAN, a Received Signal Strength Indication RSSI of the WLAN, an available channel utilization of the WLAN, a Basic Service Set BSS load of the WLAN and the number of stations STA accessed in the WLAN. Herein, RSSI of the WLAN means RSSI between the terminal and an AP connected thereto. For example, the terminal may measure the strength of a received signal that is sent by the AP connected to the terminal to obtain the RSSI value. The available channel utilization of the WLAN means the utilization ratio of an available channel in the second link. The BSS load of the WLAN means a load condition of the BSS (namely, the BSS to which the AP connected to the terminal belongs) to which the terminal belongs. The number of the STAs accessed in the WLAN means the number of the STAs connected to the AP that is connected to the terminal.

In step 302, the amount of data transmitted to the correspondent node by the second link is determined in accordance with the relevant information of the WLAN.

The terminal determines the amount of the data transmitted to the correspondent node by the second link in accordance with the relevant information of the WLAN. The amount of data may be a specific value which means a ratio of the amount of the data transmitted to the correspondent node by the second link to the total amount of data that is required to be transmitted to the correspondent node. Alternatively, the amount of data may be a value which indicates the number (unit: piece) of data packets or the data size (unit: bit).

In an example, when the amount of data is the value which indicates the number of the data packets or the data size, step 302 may include the following sub-steps:

1. acquiring the current amount of data in an uplink buffer that is configured to store uplink data; and 2. determining the amount of the data transmitted to the correspondent node by the second link in accordance with the relevant information of the WLAN and the current amount of data.

The uplink buffer is a data buffer for storing the uplink data. Taking an LWA scenario as an example, since flow distribution is performed through a PDCP layer, the uplink buffer is a PDCP buffer. For example, the current number of the data packets in the uplink buffer is n, the terminal determines that the number of data packets transmitted to the correspondent node by the second link is m in accordance with the relevant information of the WLAN and the number n of the data packets, where n≥m≥1, and n and m are integers. For another example, the current amount of data in the uplink buffer is a bit, the terminal determines that the amount of the data transmitted to the correspondent node by the second link is b bit in accordance with the relevant information of the WLAN and the amount of data, where a≥b≥1, and a and b are integers. In consideration that different data packets may contain different data sizes, the amount of data may be represented more accurately by the data size (number of bits).

Optionally, after determining the amount of the data transmitted to the correspondent node by the second link, the terminal sends a BSR (Buffer Status Report) to the base station in the cellular network. Herein, the BSR includes a difference value between the current amount of data in the upper buffer and the amount of data transmitted by the second link. The base station is configured to allocate an uplink resource for the terminal in accordance with the difference value. The terminal acquires the uplink resource allocated by the base station. In the aspects of the present disclosure, by carrying the difference value in the BSR instead of carrying the current amount of data in the uplink buffer, since the difference value reflects more accurately the amount of data which are planned to be transmitted to the correspondent node by the first link provided by the cellular network, the base station may allocate the uplink resource more accurately in accordance with the difference value.

Thus, the base station is prevented from allocating excessive uplink resources for UE. Accordingly, waste of the resources is avoided.

Besides, the aspects of the present disclosure do not limit a specific mode in which the terminal determines the amount of the data transmitted to the correspondent node by the second link in accordance with the relevant information of the WLAN. In an example, when the relevant information of the WLAN only includes one piece of information, the terminal determines the amount of the data transmitted by the second link in accordance with the piece of information. For example, the proportion of the amount of the data transmitted by the second link to the total amount of data is calculated and inquired in accordance with the piece of information. After that, the amount of the data transmitted by the second link is worked out in accordance with the current amount of data in the uplink buffer and the proportion. When the relevant information of the WLAN includes multiple pieces of information, the terminal may determine the amount of the data transmitted by the second link with reference to the multiple pieces of information. For example, different information items are configured with different weights. The proportion of the amount of the data transmitted by the second link to the total amount of data is calculated and determined in accordance with the pieces of information and the corresponding weights. After that, the amount of the data transmitted by the second link is worked out in accordance with the current amount of data in the uplink buffer and the proportion.

In step 303, uplink data is transmitted to the correspondent node through the second link in accordance with the amount of data.

The terminal transmits the uplink data to the correspondent node through the second link in accordance with the amount of the data. For example, when the current amount of data in the uplink buffer is a bit, and the amount of data transmitted to the correspondent node by the second link is determined by the terminal to be b bit, the terminal transmits the b bit of uplink data to the correspondent node through the second link and transmits the a-b bit of uplink data to the correspondent node through the first link.

In addition, in an uplink transmission process, the terminal may periodically execute the steps 301-303 to continuously adjust the amount of data transmitted to the correspondent node by the first link and the second link respectively.

Optionally, the data transmission method provided by the aspect further includes the following steps 304-305.

In step 304, a network status is acquired.

The terminal acquires the network status which includes but not limited to at least one of link quality of the first link, link quality of the second link, a load condition of the cellular network and a load condition of the WLAN. The load condition of the cellular network may be an overall load condition of the cellular network which is accessed by the terminal, and may also be a load condition of the base station connected to the terminal. The load condition of the WLAN may be an overall load condition of the WLAN which is accessed by the terminal, and may also to a load condition of the AP connected to the terminal.

In step 305, the amount of data transmitted by the first link or the second link is adjusted in accordance with the network status.

The terminal adjusts the amount of data transmitted by the first link or the amount of data transmitted by the second link in accordance with the network status. In the aspect of the present disclosure, the specific adjustment mode is not limited. For example, when the link quality of the first link is improved, and/or the link quality of the second link is reduced, and/or the load condition of the cellular network is mitigated, and/or the load condition of the WLAN is increased, the terminal increases the amount of data transmitted by the first link and reduces the amount of data transmitted by the second link. On the contrary, when the link quality of the first link is reduced, and/or the link quality of the second link is improved, and/or the load condition of the cellular network is increased, and/or the load condition of the WLAN is mitigated, the terminal reduces the amount of data transmitted by the first link and increases the amount of data transmitted by the second link.

To sum up, the data transmission method provided by the aspect acquires the relevant information of the WLAN which is accessed by the home terminal, determines the amount of data transmitted to the correspondent node by the second link provided by the WLAN in accordance with the relevant information of the WLAN, and transmits the uplink data to the correspondent node through the second link in accordance with the determined amount of data. An uplink transmission solution in the LWA technology is provided. The sizes of data transmitted on the first link provided by the cellular network and the second link provided by the WLAN are determined based on the relevant information of the WLAN. Thus, distributing transmission of the uplink data is realized. The data transmission pressure of the cellular network is reduced. The allocation reasonability of the amount of the data transmitted on the two links are guaranteed.

In addition, the BSR is further sent to the base station in the cellular network by the terminal, and includes the difference value between the current amount of data in the uplink buffer and the amount of data transmitted by the second link, such that the base station allocates an uplink resource for the terminal in accordance with the difference value. Since the difference value more accurately reflects the amount of data which are planned to be transmitted to the correspondent node by the first link provided by the cellular network, the base station may allocate the uplink resource more accurately in accordance with the different value. Thus, the base station is prevented from allocating excessive uplink resources for UE. Accordingly, waste of the resource is avoided.

In addition, the network status is acquired through the terminal. The amount of data transmitted by the first link or the second link is dynamically adjusted in accordance with the network status to maximize the resource utilization ratio and to improve the system performance.

The aspects of the present disclosure provide an uplink transmission solution in a cellular network and WLAN aggregation scenario. Optionally, when the cellular network is an LTE network, an aggregation architecture adopting the uplink transmission solution provided by the aspects of the present disclosure may be referred to as eLWA (enhanced LTE-WLAN Aggregations). By adoption of the technical solution provided in the aspects of the present disclosure, distributing transmission of the uplink data is realized. The data transmission pressure of the cellular network is reduced.

The followings are the device aspects of the present disclosure, which may be used to implement the method aspects of the present disclosure. For details which are not disclosed in the device aspects of the present disclosure, reference may be made to the method aspects of the present disclosure.

Figure 4:
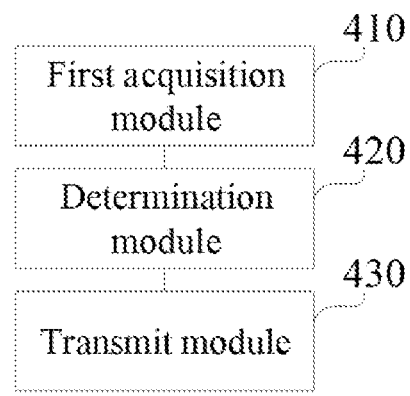
FIG. 4 is a block diagram of a data transmission device according to an exemplary aspect of the present disclosure.

FIG. 4 is a block diagram of a data transmission device according to an exemplary aspect. The device may be applied to the terminal in the implementing environment of FIG. 1. The terminal establishes a communication connection with a correspondent node through a first link provided by a cellular network and a second link provided by a WLAN respectively. The device has the function of implementing the above methods and the function can be implemented through hardware or through software executed by relevant hardware. The device may include: a first acquisition module 410, a determination module 420 and a transmit module 430.

The first acquisition module 410 is configured to acquire relevant information of the WLAN which is accessed by a home terminal, and the relevant information of the WLAN is used to indicate a data distribution capability of the WLAN.

The determination module 420 is configured to determine the amount of data transmitted to the correspondent node by the second link in accordance with the relevant information of the WLAN.

The transmit module 430 is configured to transmit uplink data to the correspondent node through the second link in accordance with the amount of data.

To sum up, the data transmission device provided by the aspect acquires the relevant information of the WLAN which is accessed by the home terminal, determines the amount of data transmitted to the correspondent node by the second link provided by the WLAN in accordance with the relevant information of the WLAN, and transmits the uplink data to the correspondent node through the second link in accordance with the determined amount of data. An uplink transmission solution in the LWA technology is provided. The sizes of data transmitted on the first link provided by the cellular network and the second link provided by the WLAN are determined based on the relevant information of the WLAN. Thus, distributing transmission of the uplink data is realized. The data transmission pressure of the cellular network is reduced. The allocation reasonability of the amount of the data transmitted on the two links are guaranteed.

In an alternative aspect provided based on the aspect shown in FIG. 4, the relevant information of the WLAN comprises at least one of at least one of a version number of the WLAN, a Received Signal Strength Indication RSSI of the WLAN, an available channel utilization of the WLAN, a Basic Service Set BSS load of the WLAN and the number of stations STA accessed in the WLAN.

Figure 5:
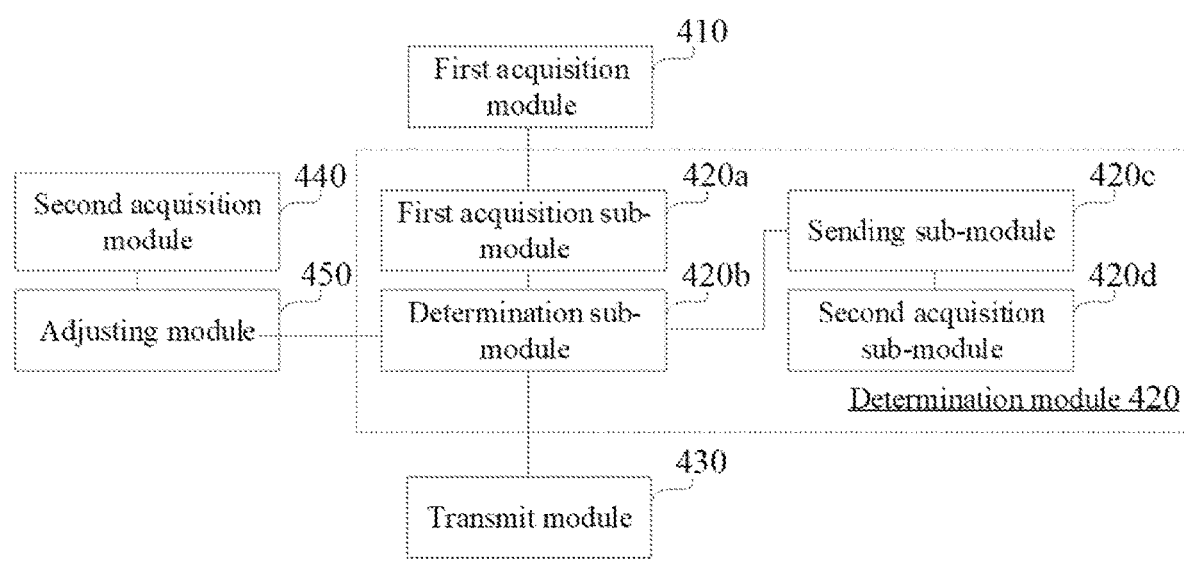
FIG. 5 is a block diagram of a data transmission device according to another exemplary aspect of the present disclosure.

In another alternative aspect provided based on the aspect shown in FIG. 4, as shown in FIG. 5, the determination module 420 includes: a first acquisition sub-module 420a and a determination sub-module 420b.

The first acquisition sub-module 420a is configured to acquire a current amount of data in the uplink buffer that is configured to store the uplink data.

The determination sub-module 420b is configured to determine the amount of the data transmitted to the correspondent node by the second link in accordance with the relevant information of the WLAN and the current amount of data.

Optionally, the determination module 420 further includes: a sending sub-module 420c and a second acquisition sub-module 420d.

The sending sub-module 420c is configured to send a BSR to a base station in the cellular network, the BSR comprises a difference value between the current amount of data and the amount of the data transmitted by the second link, and the base station is configured to allocate an uplink resource for the terminal in accordance with the difference value.

The second acquisition sub-module 420d is configured to acquire the uplink resource allocated by the base station.

In a yet another alternative aspect provided based on the aspect shown in FIG. 4, as shown in FIG. 5, the device further includes: a second acquisition module 440 and an adjusting module 450.

The second acquisition module 440 is configured to acquire a network status.

The adjusting module 450 is configured to adjust the amount of data transmitted by the first link or the second link in accordance with the network status.

Optionally, the network status comprises at least one of the link quality of the first link, the link quality of the second link, the load condition of the cellular network and the load condition of the WLAN.

It should be noted that the device provided by the above aspect is exemplified only by the division of the above respective functional modules when implementing its function. In practical application, the above-described functions may be assigned and completed by different functional modules in accordance with requirements, such that the internal structure of the device can be divided into different functional modules to complete all or part of the functions described above.

With respect to the device of the above aspect, the specific mode of operation performed by each module has been described in details in the aspect of the method, and the description thereof may not be described in details herein.

An exemplary aspect of the present disclosure further provides a terminal which is capable of implementing the data transmission method provided in the aspects of the present disclosure. The terminal may include: a processor and a memory for storing instructions executable by the processor. Herein, the processor is configured to:

acquire relevant information of the WLAN which is accessed by a home terminal, and the relevant information of the WLAN is used to indicate a data distribution capability of the WLAN;

determine the amount of data transmitted to the correspondent node by the second link in accordance with the relevant information of the WLAN; and transmit uplink data to the correspondent node through the second link in accordance with the amount of data.

Optionally, the relevant information of the WLAN comprises at least one of a version number of the WLAN, a Received Signal Strength Indication RSSI of the WLAN, an available channel utilization of the WLAN, a Basic Service Set BSS load of the WLAN and the number of stations STA accessed in the WLAN.

Optionally, the processor is configured to:
acquire a current amount of data in an uplink buffer that is configured to store the uplink data; and
determine the amount of the data transmitted to the correspondent node by the second link in accordance with the relevant information of the WLAN and the current amount of data.

Optionally, the processor is configured to:
send a Buffer Status Report (BSR) to a base station in the cellular network, wherein the BSR comprises a difference value between the current amount of data and the amount of the data transmitted by the second link, and the base station is configured to allocate an uplink resource for the terminal in accordance with the difference value; and
acquire the uplink resource allocated by the base station.

Optionally, the processor is further configured to:
acquire a network status; and
adjust the amount of data transmitted by the first link or the second link in accordance with the network status.

Optionally, the network status comprises at least one of the link quality of the first link, the link quality of the second link, the load condition of the cellular network and the load condition of the WLAN.

Figure 6:
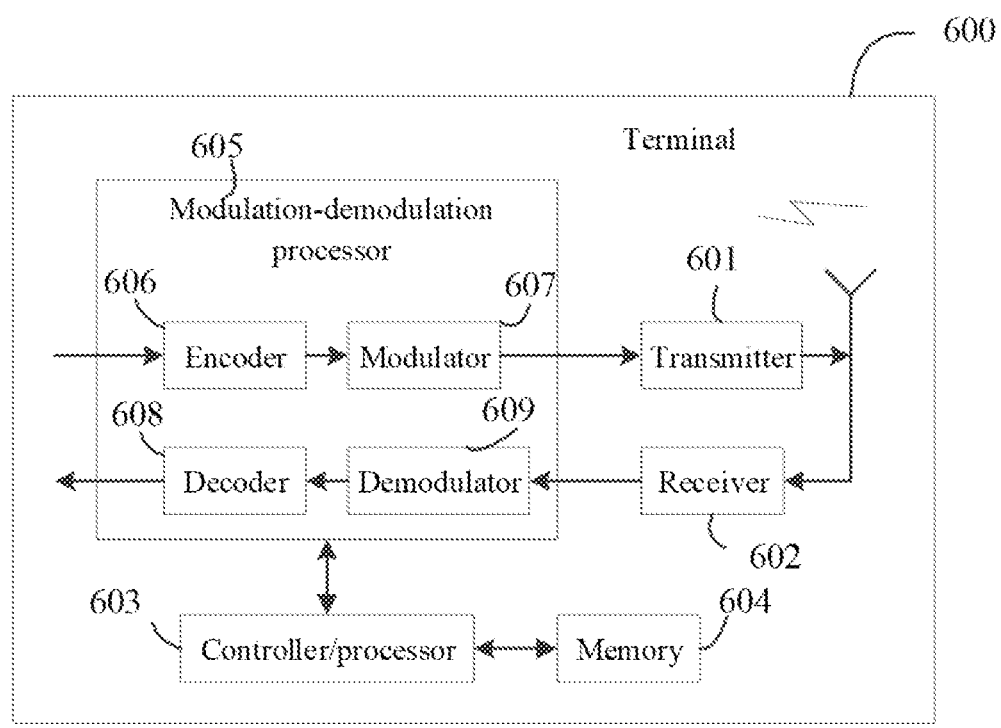
FIG. 6 is simplified schematic view of a terminal according to an exemplary aspect of the present disclosure.

FIG. 6 is a simplified schematic view of a possible design structure of a terminal according to an exemplary aspect. The terminal 600 includes a transmitter 601, a receiver 602 and a processor 603. The processor 603 may also be a controller, and is indicated as "controller/processor 603" in FIG. 6. Optionally, the terminal 600 may further include a modulation-demodulation processor 605. The modulation-demodulation processor 605 may include an encoder 606, a modulator 607, a decoder 608 and a demodulator 609.

In an example, the transmitter 601 adjusts (such as analog converts, filters, amplifies and up converts) the output samples and generates an uplink signal that is transmitted to the base station in the above-mentioned aspect through an antenna. On a downlink, the antenna receives the downlink signal transmitted by the base station in the above-mentioned aspect. The receiver 602 adjusts (such as filters, amplifies, down converts and digitizes) the signals received from the antenna and provides input samples. In the modulation-demodulation processor 605, the encoder 606 receives business data and a signaling message which are to be sent on the uplink, and processes (such as formats, encodes and interleaves) the business data and the signaling message. The modulator 607 further processes (such as symbol maps and modulates) the encoded business data and signaling message and provides output samples. The demodulator 609 processes (such as demodulates) the input samples and provides symbol estimation. The decoder 608 processes (such as de-interleaves and decodes) the symbol estimation and provides the decoded data and signaling message which are sent to the terminal 600. The encoder 606, the modulator 607, the demodulator 609 and the decoder 608 may be implemented by the synthesized modulation-demodulation processor 605. These units perform processing in accordance with the wireless access technology (such as LTE and other access technologies of an evolution system). It should be noted that when the terminal 600 does not include the modulation-demodulation processor 605, the above functions of the modulation-demodulation processor 605 may also be completed by the processor 603.

The processor 603 performs control management on actions of the terminal 600 and is configured to execute the processes performed by the terminal 600 in the aspects of the present disclosure. For example, the processor 603 is further configured to execute the step processes in FIG. 2 and FIG. 3, and/or other step processes of the technical solution described by the present disclosure.

Further, the terminal 600 may further include a memory 604 configured to store a program code and data for the terminal 600.

The processor configured to execute the functions of the terminal in the aspects of the present disclosure may be a Central Processing Unit (CPU), a general-purpose processor, a Digital Signal Processor (DSP), an Application-Specific Integrated Circuit (ASIC), an Field Programmable Gate Array (FPGA), or other programmable logic devices, transistor logic devices, hardware components or any combinations thereof. The processor may realize or execute various exemplary logic boxes, modules and circuits, which are described with reference to the aspects of the present disclosure. The processor may also be a combination for achieving calculation, such as a combination including one or more microprocessors and a combination of DSP and microprocessor.

The steps of the method or algorithm described with reference to the aspects of the present disclosure may be realized by means of hardware or in the way that the processor executes a software instruction. The software instruction may consist of a corresponding software module that may be stored in a Random Access Memory (RAM), a flash memory, a Read Only Memory (ROM), an Erasable Programmable ROM (EPROM), an Electrically EPROM (EEPROM), a register, a hard disk, a mobile hard disk, a CD-ROM or storage medium in any other formats well known in the art. An exemplary storage medium is coupled with the processor, such that the processor may read information from the storage medium and write information into the storage medium. Certainly, the storage medium may also be part of the processor. The processor and the storage medium may be located in the ASIC. In addition, the ASIC may be located in the terminal. Certainly, the processor and the storage medium may also exist as discrete components in the terminal.

The aspects of the present disclosure further provide a computer storage medium for storing the computer software instruction used by the terminal. The computer storage medium contains a program that is designed for executing the above-mentioned method.

Those skilled in the art should appreciate that in one or more of the above examples, the functions described in the aspects of the present disclosure may be implemented by hardware, software, firmware, or any combinations thereof. When implemented by software, the functions may be stored in a computer readable medium or transmitted as one or more instructions or codes on the computer readable medium. The computer readable medium includes a computer storage medium and a communication medium including any medium that facilitates transfer of a computer program from one location to another. The storage medium may be any available medium that can be accessed by a general-purpose or special-purpose computer.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

It should be understood that "a plurality" as referred to herein means two or more. "And/or" describes an association relationship between associated objects and indicates that there may be three relationships. For example, A and/or B may indicate that there are three cases where A exists separately, A and B exist at the same time, and B exists separately. The character "I" generally indicates that an "or" relationship exists between contextual objects.

The specific implementations described above have further explained the objectives, technical solutions and beneficial effects of the aspects of the present disclosure. It should be understood that the above description is only the specific implementations of the aspects of the present disclosure and is not intended to limit the scope of protection of the aspects of the present disclosure. Any modifications, equivalent substitutions, improvements, etc., which are made based on the technical solutions of the aspects of the present disclosure, should fall within the scope of protection of the aspects of the present disclosure.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as illustrative only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method of data transmission, applied to a terminal that establishes a communication connection with a correspondent node through a first link provided by a cellular network and a second link provided by a Wireless Local Area Network (WLAN), respectively, the method comprising:
    acquiring relevant information of the WLAN that is accessed by the terminal, the relevant information of the WLAN being used to indicate a data distribution capability of the WLAN;
    acquiring a current amount of data in an uplink buffer that is configured to store uplink data, wherein the uplink data in the uplink buffer is distributed through a Packet Data Convergence Protocol (PDCP) layer;
    determining an amount of data transmitted to the correspondent node by the second link based on the relevant information of the WLAN and the current amount of data;
    transmitting uplink data to the correspondent node through the second link based on the amount of the data transmitted to the correspondent node by the second link; and
    sending a Buffer Status Report (BSR) to a base station in the cellular network, wherein the BSR comprises a difference value between the current amount of data and the amount of the data transmitted by the second link, and wherein the base station is configured to allocate an uplink resource for the terminal based on the difference value.

2. The method according to claim 1, wherein the relevant information of the WLAN comprises at least one of a version number of the WLAN, a Received Signal Strength Indication (RSSI) of the WLAN, an available channel utilization of the WLAN, a Basic Service Set (BSS) load of the WLAN, and/or a number of stations (STA) accessed in the WLAN.

3. The method according to claim 1, further comprising:
    acquiring a network status; and
    adjusting an amount of data transmitted by one of the first link and the second link based on the network status.

4. The method according to claim 3, wherein the network status comprises at least one of a link quality of the first link, a link quality of the second link, a load condition of the cellular network, and/or a load condition of the WLAN.

5. A terminal that establishes a communication connection with a correspondent node through a first link provided by a cellular network and a second link provided by a Wireless Local Area Network (WLAN), respectively, the terminal comprising:
    a processor; and
    a memory for storing instructions executable by the processor,
    wherein the processor is configured to:
        acquire relevant information of the WLAN that is accessed by the terminal, the relevant information of the WLAN is used to indicate a data distribution capability of the WLAN;
        acquire a current amount of data in an uplink buffer that is configured to store uplink data, wherein the uplink data in the uplink buffer is distributed through a Packet Data Convergence Protocol (PDCP) layer;
        determine an amount of data transmitted to the correspondent node by the second link based on the relevant information of the WLAN and the current amount of data;
        transmit uplink data to the correspondent node through the second link based on the amount of the data transmitted to the correspondent node by the second link; and
        send a Buffer Status Report (BSR) to a base station in the cellular network, wherein the BSR comprises a difference value between the current amount of data and the amount of the data transmitted by the second link, and wherein the base station is configured to allocate an uplink resource for the terminal based on the difference value.

6. The terminal according to claim 5, wherein the relevant information of the WLAN comprises at least one of a version number of the WLAN, a Received Signal Strength Indication (RSSI) of the WLAN, an available channel utilization of the WLAN, a Basic Service Set (BSS) load of the WLAN, and/or a number of stations STA accessed in the WLAN.

7. The terminal according to claim 5, wherein the processor is further configured to:
    acquire a network status; and
    adjust an amount of data transmitted by one of the first link and the second link based on the network status.

8. The terminal according to claim 6, wherein the processor is further configured to:
    acquire a network status; and
    adjust an amount of data transmitted by one of the first link and the second link based on the network status.

9. The terminal according to claim 7, wherein the network status comprises at least one of a link quality of the first link, a link quality of the second link, a load condition of the cellular network, and/or a load condition of the WLAN.

10. A non-transitory computer-readable medium storing instructions that, when executed by one or more processors of a terminal that establishes a communication connection with a correspondent node through a first link provided by a cellular network and a second link provided by a Wireless Local Area Network (WLAN), respectively, cause the terminal to:
    acquire relevant information of the WLAN which is accessed by the terminal, the relevant information of the WLAN being used to indicate a data distribution capability of the WLAN;
    acquire a current amount of data in an uplink buffer that is configured to store uplink data, wherein the uplink data in the uplink buffer is distributed through a Packet Data Convergence Protocol (PDCP) layer;

determine an amount of data transmitted to the correspondent node by the second link based on the relevant information of the WLAN and the current amount of data;

transmit uplink data to the correspondent node through the second link based on the amount of the data transmitted to the correspondent node by the second link; and send a Buffer Status Report (BSR) to a base station in the cellular network, wherein the BSR comprises a difference value between the current amount of data and the amount of the data transmitted by the second link, and wherein the base station is configured to allocate an uplink resource for the terminal based on the difference value.

* * * * *